UNITED STATES PATENT OFFICE.

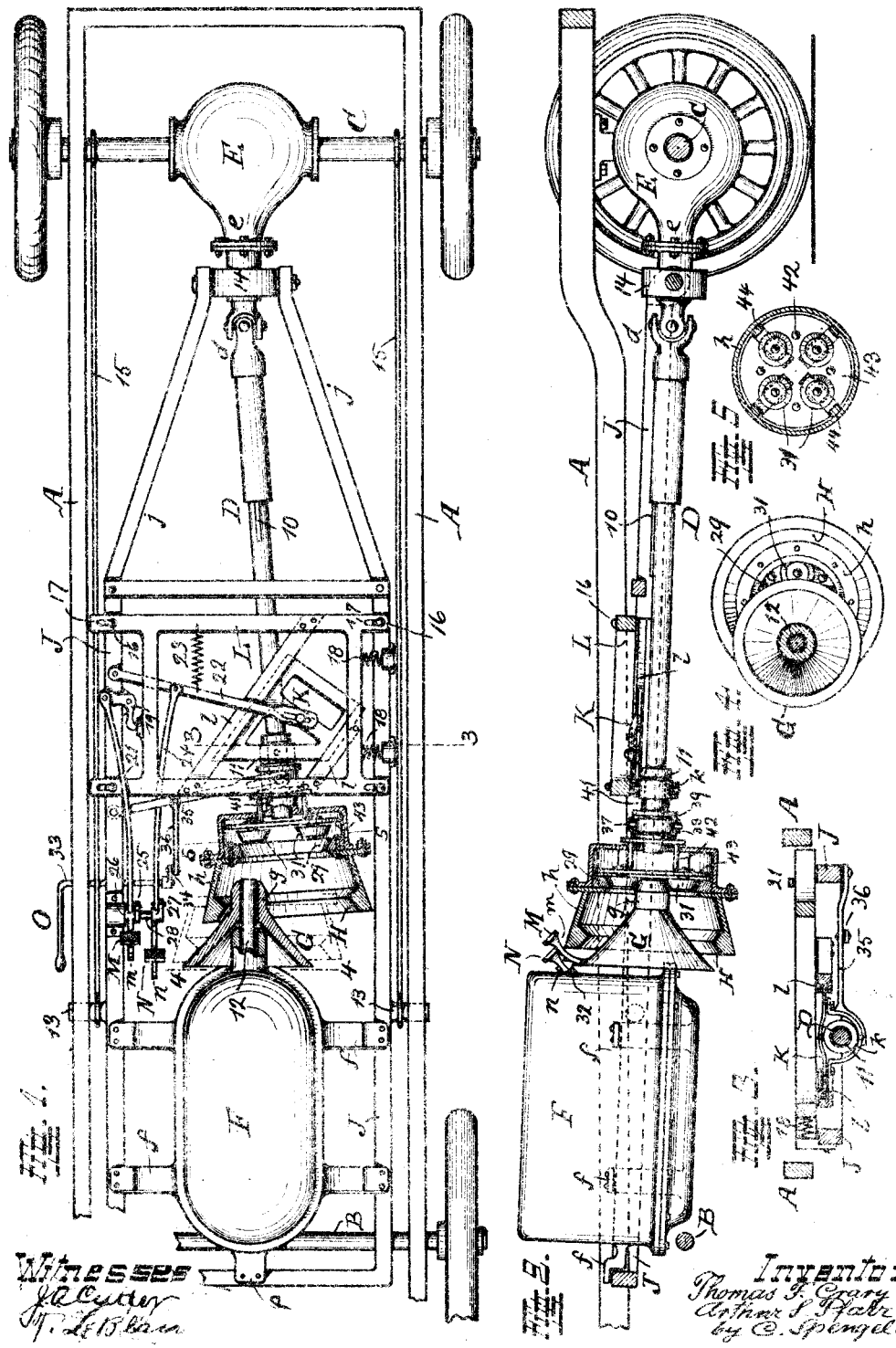

THOMAS F. CRARY AND ARTHUR S. PFARR, OF MIDDLEPORT, OHIO.

MOTOR-PROPELLED VEHICLE.

1,087,282.  Specification of Letters Patent.  Patented Feb. 17, 1914.

Application filed December 9, 1912. Serial No. 735,625.

*To all whom it may concern:*

Be it known that we, THOMAS F. CRARY and ARTHUR S. PFARR, citizens of the United States, and residing at Middleport, Meigs county, State of Ohio, have invented certain new and useful Improvements in Motor-Propelled Vehicles; and we do declare that the following is a clear, full, and exact description of the invention, attention being called to the drawing which accompanies this application and forms a part thereof.

This invention concerns improvements in motor-propelled vehicles and relates more particularly to the means whereby the power derived from the shaft, actuated by the motor, is transmitted to the driven vehicle-axle and whereby this transmission is controlled both as to speed and direction of motion.

The invention also relates to means whereby the motor is supported in a manner which prevents the devices concerned in the transmission of power from it, to be effected by any variations in the load of the vehicle and permits maintenance of a straight line drive irrespective of the effect due to such variations.

The invention is described in connection with a vehicle of customary automobile type, and illustrated accordingly.

Figure 1, of the accompanying drawing, shows in top-view the essential parts concerned in this invention. Fig. 2, is a sectional side-elevation of Fig. 1. Fig. 3, is a transverse section of Fig. 1, taken on line 3—3 of the same. Fig. 4, is a section taken on line 4—4 of Fig. 1. Fig. 5, is another section taken on line 5—5 of same figure.

In the drawing, letter A indicates the parallel, longitudinal members of the main frame, B the front axle and C the rear axle of the vehicle. Power is applied to one of these axles, usually the rear one, by means of a driving shaft D, and interposed gear-elements, inclosed in a casing E. This shaft is the usual Cardan shaft, consisting of two sections connected to each other by a universal joint d. It also consists of two sections telescopically engaged to permit adjustment in length, said sections being connected to each other for rotation by means of a spline 10. This shaft is supported in two bearings, one shown at 11 near its front end, and the other being formed in a forward extension e of gear-case E.

Shaft D is operated by shaft 12, actuated by the motor, which is contained in a casing F, provided with flanges f for attachment. The operative connection between the shafts is by the complementary, conical elements of a friction clutch, G being a cone-shaped element, mounted at the rear end of the motor shaft and H being a ring, fitted on its inside to the taper of the cone and carried at the outer edge of a cup-shaped casing h, rigidly mounted on the front end of shaft D and opposite cone G.

The face of cone G is slightly concaved so as to insure proper contact with friction ring H during the positional adjustments of this latter, to be presently described.

The motor is carried upon an intermediate or trunnion frame of which J—J, are the longitudinal members. This frame is supported by means of trunnion journals 13—13, upon frame-members A—A of the main frame. Rearwardly members J—J converge as shown at j—j and at their rear ends they are connected to a ring 14, which is fitted to the shaft-bearing formed by the extended part e of gear casing E, so as to form a support for this latter as well as a third bearing for the trunnion frame. There is no rigid connection between this ring and part e upon which it is seated, so that in case one of the rear wheels travels higher or lower than the other one, as for instance when one wheel sinks into a depression in the road, the gear casing, following the movement of the axle, may freely turn in this ring, in either direction, and no torsional strain is transmitted to the frame which carries the motor.

15—15 are radius rods passing between the rear axle and the trunnion journals and connecting both to each other.

Front-bearing 11 of shaft D is a swivel-bearing, mounted on vertically disposed pivots in a stirrup k which forms part of a slide K. This latter is fitted to move in ways l which form parts of a frame L, supported upon the trunnion frame-members J—J. This frame L is held in place by pins 16, occupying slots 17 in it and so arranged as to permit a limited movement of it transversely of the trunnion-frame and at an angle to the motor-shaft.

Springs 18 are provided which act at all times laterally against one side of frame L and the arrangement and position of the parts and length of slots 17 is such that normally friction ring H is kept out of contact with friction cone G, so that no motion is transmitted from the motor to the propelling devices. If this frame is moved in opposite direction driving contact is established between the members of the friction clutch, and the propelling devices are caused to operate.

It is usual to start at a slow speed at which time the friction members are in a position as shown in Fig. 1. Increase of speed is had by causing friction ring H to move forward on the friction cone which is done by moving shaft D accordingly by means of slide K which carries the front shaft-bearing 11, and which slide is moved forward on its guides *l*. The disposition of these guides is so as to cause the contacting surface of ring H to move forward on the face of cone G while remaining in contact therewith.

Suitable devices are provided for moving frame L and slide K for these purposes, and they are so arranged as to be accessible for manipulation from above.

For the purpose of moving frame L, against the action of springs 18 in order to bring the clutch-members in contact to transmit rotation from the motor-shaft to shaft D, there is an angle-lever 19, adapted to act at one of its free ends against frame L, when actuated by means of a link 21 at its other end.

For the purpose of moving friction ring H, with reference to cone G, to adjust (increase) speed (see dotted lines in Fig. 1), there is an arm 22, subject to actuation by a spring 23 and also by means of a link 24. Link 21 is actuated by an angle-lever 25, forming part of a rock-shaft 26, mounted in a suitable bearing. Link 24 is actuated by another angle-lever 27, forming part of a rock-shaft 28, which may find a bearing in rock-shaft 26, the latter being hollow for the purpose. Each of these angle-levers is manipulated by a treadle and a segmental treadle-rod provided with locking notches.

M, is the treadle to actuate angle-lever 25 and *m* is the treadle-rod thereof.

N, is the treadle to actuate angle-lever 27 and *n* is the treadle-rod of it. These treadle-rods extend upwardly through the floor of the cab or body of the vehicle, they passing through slotted floor-plates thereat which afford means to engage the notched treadle rods to hold the treadles and the parts operated thereby in their certain adjusted positions. These floor-plates and the adjacent parts of the body of the vehicle are omitted in the drawing to prevent obliteration of other parts necessary to show. Furthermore no novelty is claimed for these omitted parts nor for the treadle mechanism used in connection therewith since, as to construction, they follow conventional types in motor vehicle manufacture.

For the purpose of reversing motion, the reduced part *g* at the end of cone G is used in connection with a friction ring 29, and with reversing idlers 31, all within casing *h*, said members viz. part *g*, ring 29 and idlers 31, being alined and brought in contact at their faces in a manner and with means as follows: Treadle M is manipulated to release frame L, rendering it subject to action of springs 18, so as to bring ring H out of contact with the cone, a position similar to that shown in Fig. 1. Treadle N is manipulated next, to move slide K to cause casing *h* to move toward the cone so as to occupy a position as shown in Fig. 2 where it is alined with and opposite ring 29. This position is indicated to the operator and held by means of a special notch 32 on treadle-rod *n*, treadle N being acted upon accordingly to hook this notch into its floor-plate. Idlers 31, are now moved forward into the space between part *g* on the cone and friction ring 29, bringing all these parts in engagement and thereby reversing rotation of shaft D. For the purpose of so moving the idlers, a lever O, mounted upon a rock-shaft 33 is manipulated. An arm 34 at the end of this latter is connected to an arm 35, by means of a link 36. One end of arm 35 is held by a pivot and its other arm is forked, and its forked members are slotted and engage pins 37 on a ring 38, loosely mounted upon a sleeve 39. This sleeve is seated upon the hub 41 of casing *h* and whereby this latter is rigidly connected to the front end of shaft D. Pins 42 are carried on sleeve 39 and extend through perforations in the end of casing *h* into this latter where they connect to a plate 43 which carries the idlers. Guides 44 are provided inside of the casing on which this plate moves while being adjusted. The idlers are mounted in boxes which are fitted into slots in plate 43, which slots are slightly longer than the boxes in a radial direction. This permits the idlers while being pushed forward to adjust themselves to proper engaging position by making frictional contact with part *g* of cone G and also with ring 29.

The boxes in which idlers 31 are mounted may be fitted with ball-bearings.

The trunnion frame is free to follow the main frame and adjusts itself in its entirety to any positional changes which this latter frame may assume with relation to the wheels and due to variations in the load. It does not interfere, nor is it affected, as before stated, whenever the rear wheels travel out of normal horizontal alinement. Inasmuch as all the mechanical devices, including the motor, the shaft and its bearings are carried by this trunnion frame, it follows that in their positional relation to each other, these parts suffer no disturbance by reason of the positional variations of the frame mentioned. As to the drive shaft, this is of great advantage and provides for a transmission which is as straight and direct as it is possible under the circumstances. Longitudinal strain between the driven rear axle and the trunnion frame is taken up by radius rods 15—15 which form a connection between these parts entirely independent of all mechanical devices and relieve them entirely of all strain and any possible wear incident thereto.

Having described our invention, we claim as new:

1. In a motor-propelled vehicle, the combination of a main frame, front and rear axles, a motor, a shaft actuated thereby, a driving shaft, a bearing for it at its front end, a gear-casing on the rear axle, a bearing for the rear-end of the driving shaft provided on the gear casing, a frame upon which the motor is carried, transversely opposite trunnion-journals whereby this frame is supported on the main frame, an additional bearing whereby said motor-carrying frame is supported upon the gear-casing and means to connect the trunnion-journals and the rear-axle.

2. In a motor-propelled vehicle, the combination of a motor, a motor-shaft, a Cardan driving-shaft, front and rear bearings for the same whereby it is supported rearwardly of the motor-shaft, the front bearing being a swivel-bearing, complementary friction-gear members, one mounted on each of these shafts, a transversely adjustable frame whereby the front bearing of the driving shaft is supported, means whereby this frame is normally held in a position to prevent driving contact between the friction-gear members and manipulating devices for shifting this frame to establish driving contact between said members.

3. In a motor-propelled vehicle, the combination of a motor, a motor-shaft, a Cardan driving-shaft, front and rear-bearings for the same whereby it is supported rearwardly of the motor-shaft, the front bearing being a swivel-bearing, complementary friction-gear members, one mounted on each of these shafts, a transversely movable, spring-actuated frame whereby the front-bearing of the driving-shaft is supported and whereby the same is held in a normal position which prevents driving-contact between the friction-gear members and manipulating-devices for shifting this frame to establish driving-contact between said members.

4. In a motor-propelled vehicle, the combination of a motor, a motor-shaft, a frame upon which the motor is supported, a Cardan driving-shaft comprising two telescopically connected sections splined to each other for rotation, front and rear-bearings whereby this shaft is supported rearwardly of the motor shaft, complementary friction-gear members, one mounted on each of these shafts, a slide on which the front-bearing of the driving-shaft is supported by means of a swiveled connection, guide-ways arranged at an angle to this shaft in which this slide is mounted and means to shift the same on these ways, to adjust the position of the driving-contact between the friction-gear members to effect changes in speed.

5. In a motor-propelled vehicle, the combination of a main-frame, a motor, a trunnion-frame which carries the motor and which is mounted upon the main frame, a motor-shaft, a Cardan driving-shaft, front and rear-bearings whereby it is supported rearwardly of the motor-shaft, the front bearing being a swivel-bearing, a friction-cone mounted upon the rear-end of the motor-shaft, a complementary friction-gear member mounted upon the front-end of the driving-shaft, a frame mounted to be adjustable transversely with reference to the trunnion-frame and supporting the front-bearing of the driving shaft and means to adjust this frame.

6. In a motor-propelled vehicle, the combination of a main-frame, front and rear-axles, a motor, a motor-shaft, a Cardan driving-shaft comprising two telescopically connected sections splined to each other for rotation, a friction-cone mounted upon the rear-end of the motor-shaft, a complementary friction-member mounted upon the front-end of the driving-shaft, a gear-casing supported upon the rear-axle, a bearing for the rear-end of the driving-shaft provided on this casing, a support for the front-end of this latter shaft, a frame which carries the motor and the front-support of the driving-shaft, transversely opposite trunnion-journals whereby this frame, at its forward part, is supported on the main-frame, a rear-support for said frame, said supports being arranged so as to maintain all parts of the driving-shaft and of the motor-shaft alined in a plane transversely of the main-frame and means to adjust the front bearing of the driving-shaft in a plane parallel to said plane.

7. In a motor-propelled vehicle, the combination of a motor, a motor-shaft, a Cardan driving-shaft comprising two telescopically connected sections splined to each other for rotation, a friction-cone mounted upon the rear-end of the motor-shaft, a complementary friction-member mounted upon the front-end of the driving shaft, front and rear-bearings for this shaft, a slide which carries the front-bearing, a frame provided with guide-ways arranged at an angle to the driving-shaft on which this slide is mounted, another frame which carries the motor and upon which the frame first mentioned is supported to be transversely adjustable, means to adjust this frame upon the motor-carrying frame and means to adjust the slide independently of the frame on which it is carried.

8. In a motor-propelled vehicle, the combination of a motor, a motor-shaft, a driving-shaft supported rearwardly of the motor-shaft, a friction-cone mounted upon the rear-end of the motor-shaft, a friction-element mounted upon the front-end of the driving-shaft and comprising two internal friction-rings, idlers adjustably mounted within this friction-element, means to adjust this element to make or break driving-contact between one of the friction-rings and the friction-cone, means to adjust the idlers thereon so as to be in driving-contact with the other friction-ring and means to shift this element so as to effect driving-contact between said idlers and the friction-cone.

In testimony whereof, we hereunto affix our signatures in presence of two witnesses.

THOMAS F. CRARY.
ARTHUR S. PEARE.

Witnesses:
JOSEPH McBRIDE,
WILLIAM SAISHER.